United States Patent
Bonko

[19]

[11] Patent Number: 5,901,765
[45] Date of Patent: May 11, 1999

[54] PNEUMATIC AGRICULTURAL TIRE

[75] Inventor: Mark Leonard Bonko, Uniontown, Ohio

[73] Assignee: The Goodyear Tire & Rubber Company, Akron, Ohio

[21] Appl. No.: 08/620,149

[22] Filed: Mar. 22, 1996

[51] Int. Cl.[6] .................... B60C 11/11; B60C 107/02; B60C 121/00

[52] U.S. Cl. ...................................... 152/209 B

[58] Field of Search ................ 152/209 R, 209 B, 152/209 D; D12/151

[56] References Cited

U.S. PATENT DOCUMENTS

| D. 303,365 | 9/1989 | Bonko | D12/151 |
|---|---|---|---|
| D. 303,366 | 9/1989 | Bonko | D12/151 |
| D. 303,367 | 9/1989 | Bonko et al. | D12/151 |
| D. 303,779 | 10/1989 | Bonko | D12/151 |
| D. 304,320 | 10/1989 | Bonko | D12/151 |
| D. 362,222 | 9/1995 | Guspodin et al. | D12/147 |
| D. 377,923 | 2/1997 | Bonko | D12/147 |
| 3,603,370 | 9/1971 | Hylbert et al. | 152/209 |
| 4,383,567 | 5/1983 | Crum et al. | 152/209 B |
| 4,534,392 | 8/1985 | Bonko et al. | 152/209 B |
| 4,711,283 | 12/1987 | Bonko et al. | 152/209 B |
| 5,046,541 | 9/1991 | Bonko | 152/209 B |
| 5,318,086 | 6/1994 | Narumi et al. | 152/209 B |
| 5,411,067 | 5/1995 | Beeghly et al. | 152/209 B |
| 5,421,388 | 6/1995 | Bonko et al. | 152/209 B |
| 5,464,050 | 11/1995 | Bonko | 152/209 B |

FOREIGN PATENT DOCUMENTS

| 423058A2 | 4/1991 | European Pat. Off. . | |
| 29521289 | 1/1997 | Germany . | |
| 1133122 | 1/1985 | U.S.S.R. | 152/209 B |
| 1284847 | 1/1987 | U.S.S.R. | 152/209 B |
| 2042992 | 1/1980 | United Kingdom | 152/209 B |

*Primary Examiner*—Steven D. Maki
*Attorney, Agent, or Firm*—David L. King

[57] ABSTRACT

A pneumatic agricultural tire 20 has a tread 32 having a plurality of central lugs 50 arranged in a circumferentially continuous row and extending across the equatorial plane. Each central lug 50 is similar but oppositely oriented relative to each circumferentially adjacent central lug 50. Each central lug 50 has a circumferentially extending leading end portion 51 and a circumferentially extending trailing end portion 53. The leading and trailing end portions 51,53 are located on opposite sides of the equatorial plane. The end portions 51,53 being connected by a middle inclined portion 55, the middle inclined portion 55 being oriented at an angle $\theta$ of 50° or less relative to the equatorial plane. This central lug 50 in combination with pluralities of first and second shoulder lugs 40,42 provides excellent traction.

9 Claims, 5 Drawing Sheets

PNEUMATIC AGRICULTURAL TIRE

BACKGROUND OF THE INVENTION

This invention relates to a pneumatic agricultural tire for the drive axle of a tractor or like vehicle.

Farm tires for the drive axle of a tractor have a primary function of providing tremendous pulling traction in soil. To accomplish this task the tread patterns are very open with widely circumferentially spaced elongated traction elements commonly called lugs or bars. Most such tires employ what is called "long bars." These lugs extend from the tread shoulders axially inwardly and some or all of the lugs cross the tread centerline. These lugs or bars commonly have an enlarged lug head at the axially innermost portion of the lug. Such tires are shown in prior art U.S. Pat. Nos. 3,603,370, 4,383,567, and 4,534,392.

The primary limitation of such tires was related to the limited amount of lug edges or surfaces which could be provided for traction. To increase this feature, the named inventor of this patent earlier developed a tire commercially sold as the Goodyear DT710 tire. This tire is described in U.S. Pat. No. 5,046,541. The tire employed four rows of relatively short bars. This increased number of bars provided much more biting edges for traction and as a result has demonstrated significantly superior traction.

Some farmers, however, are reluctant to believe that short bars can be as effective in very wet soils which can tend to pack the tires with mud. Although the DT710 tires perform very well in these conditions, the inventor has attempted to achieve a tractor tire having a combination of long bars and short bars with excellent tractive performance, handling and ride performance and superior tread cleaning properties in sloppy wet soil conditions. To accomplish this result the inventor has designed a unique tractor tread 32 that has a circumferentially continuous row of alternating central lugs 50 which cross at the center of the tread 32.

The tire 20 of the present invention has a very durable design that is believed to be capable of excellent performance in very wet and very dry soil conditions. This multipurpose capability, coupled with the roadworthy handling and ride features, means that a farmer can rely on one set of these tires that will meet the entire range of farming conditions. Currently, farmers must stock a variety of special application tires like rice cane and the like in addition to conventional tires. This inventive tire 20 will make that practice in many cases obsolete and will, therefore, provide a good cost savings for many farmers.

SUMMARY OF THE INVENTION

A pneumatic agricultural tire 20 for the drive axle of a tractor or like vehicle has a maximum section width (W), an axis of rotation, an equatorial plane, the equatorial plane being centered between the maximum section width and being perpendicular to the axis, a casing having a carcass 21 reinforced with rubber coated cords, a rubber tread 32 disposed radially outwardly of the carcass 21.

The tread 32 is divided on each side of the equatorial plane into a first and a second tread half 32A and 32B. The tread 32 has an inner tread 34 and a plurality of tread lugs 40,42,50. The tread has a pair of lateral tread edges 33A and 33B. The distance between the lateral tread edges defines the tread width TW.

A plurality of central lugs 50 are arranged in a circumferentially continuous row 60 and extend across the equatorial plane. Each central lug 50 is similar in appearance but oppositely oriented relative to each circumferentially adjacent central lug 50. Each central lug 50 has a substantially circumferentially extending leading end portion 51 and a substantially circumferentially extending trailing end portion 53. The leading and trailing end portions 51,53 of each central lug 50 are located on an opposite sides of the equatorial plane.

Additionally, the tread 32 has a plurality of first shoulder lugs 40 projecting radially outwardly from the inner tread surface 34 and extending from the lateral edge 33A,33B toward the equatorial plane of the tire. The first shoulder lugs 40 have an axially inner end 41 circumferentially located between a leading end 51 and a trailing end 53 of the circumferentially adjacent central lugs 50. The first shoulder lugs 40 extend from each lateral edge 33A,33B and are similar in appearance and shape but are circumferentially offset and opposite in orientation relative to the first shoulder lugs 40 extending from an opposite tread edge 33A or 33B. Each of the first shoulder lugs 40 are located within one tread half 32A or 32B.

The tread 32 further has a plurality of second shoulder lugs 42 projecting radially from the inner tread 34. The second shoulder lugs 42 extend from each lateral tread edge 33A or 33B. These lugs 42 being similar in appearance but are circumferentially offset and oppositely oriented relative to the lugs 42 extending from an opposite lateral edge 33A or 33B. Each second shoulder lug 42 lies within one tread half 32A or 32B and is circumferentially located between a pair of first shoulder lugs 40 within the tread half 32A or 32B from which it is located.

These second shoulder lugs 42 have an axially inner end 44 circumferentially aligned with a trailing end 53 portion of a central lug 50 located on an opposite tread half 32A or 32B.

Each central first shoulder, and second shoulder lug 50,40,42 has a radially outer surface 58,48,47. The minimum distance between the surfaces 58,48,47 of the lugs 50,40,42 is greater than 175% of the average width (W) of the lugs as measured at the respective radially outer surfaces.

The tread 32 has a net-to-gross ratio of less than 25% as measured around the entire 360° circumference of a normally inflated and normally load tire 20 contacting a flat hard surface.

The central lugs 50 each have an elongated middle portion 55. The lug 50 has a pair of lug edges 52,54, one leading edge 52 and one trailing edge 54. A line 63 centered between the leading and trailing edge at the surface of the middle portion 55 defines the central lug centerline 63B, the centerline 63B is inclined at an included angle θ relative to the equatorial plane of the tread. The angle θ is less than 50° preferably about 45°.

The leading and trailing ends 51,53 of the center lug 50 preferably each have a length of about 20% or more of the total lug length l. The middle portion has a length of about 30% or more of the total lug length l. The leading and trailing portions 51,53 each have a centerline 63A and 63C which is substantially circumferentially extending at an angle β relative to the equatorial plane the angle β about 30° or preferably less than 30°.

The combination of the central lugs 50 and the first and second shoulder lugs 40,42 provide exceptionally good tractive performance and a very smooth low vibration ride when driven on road surfaces. The arrangement of lugs creates large soil discharge channels 36 which expand volumetrically as they progress laterally outwardly from the center of the tread pattern this feature greatly enhances the self cleaning properties of this tread pattern.

Definitions

"Aspect Ratio" means the ratio of its section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers, the bead or beads under the tread being encapsulated in tread rubber can be with or without other cord reinforced fabric elements.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about a 25–65° angle with respect to the equatorial plane of the tire, the ply cords running at opposite angles in alternate layers.

"Carcass" means a laminate of tire ply material and other tire components cut to length suitable for splicing, or already spliced, into a cylindrical or toroidal shape. Additional components may be added to the carcass prior to its being vulcanized to create the molded tire.

"Circumferential" means lines or directions extending along the perimeter of the surface of the annular tread perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tire and Rim Technical Organization—Standards Manual and the term design rim means the same as the standard measurement rims. In Japan, the standard organization is The Japan Automobile Tire Manufacturer's Association.

"Design Rim Width" is the specific commercially available rim width assigned to each tire size and typically is between 75% and 90% of the specific tire's section width.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Net-to-gross Ratio" means the ratio of the surface are of the normally loaded and normally inflated tire tread rubber that makes contact with a hard flat surface, divided by the total area of the tread, including noncontacting portions such as grooves as measured around the entire circumference of the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Radial" and "radially" mean directions radially toward or away from the axis of rotation of the tire.

"Radial Ply Tire" means a belted or circumferentially-restricted pneumatic tire in which the ply cords which extend from bead to bead are laid at cord angles between 65° and 90° with respect to the equatorial plane of the tire.

"Section Height" (SH) means the radial distance from the nominal rim diameter to the outer diameter of the tire at its equatorial plane.

"Section Width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire Design Load" is the base or reference load assigned to a tire at a specific inflation pressure and service condition; other load-pressure relationships applicable to the tire are based upon that base or reference.

"Trailing" refers to a portion or part of the tread that contacts the ground last, with respect to a series of such parts or portions during rotation of the tire in the direction of travel.

"Tread Arc Width" (TAW) means the width of an arc having its center located on the plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Tread Width" means the arc length of the tread surface in the axial direction, that is, in a plane parallel to the axis of rotation of the tire.

"Unit Tread Pressure" means the radial load borne per unit area (square centimeter or square inch) of the tread surface when that area is in the footprint of the normally inflated and normally loaded tire.

BRIEF DESCRIPTION OF THE DRAWINGS

The following is a brief description of the drawings in which like parts bear like reference numerals and in which.

DETAILED DESCRIPTION OF THE INVENTION

Figure 4:
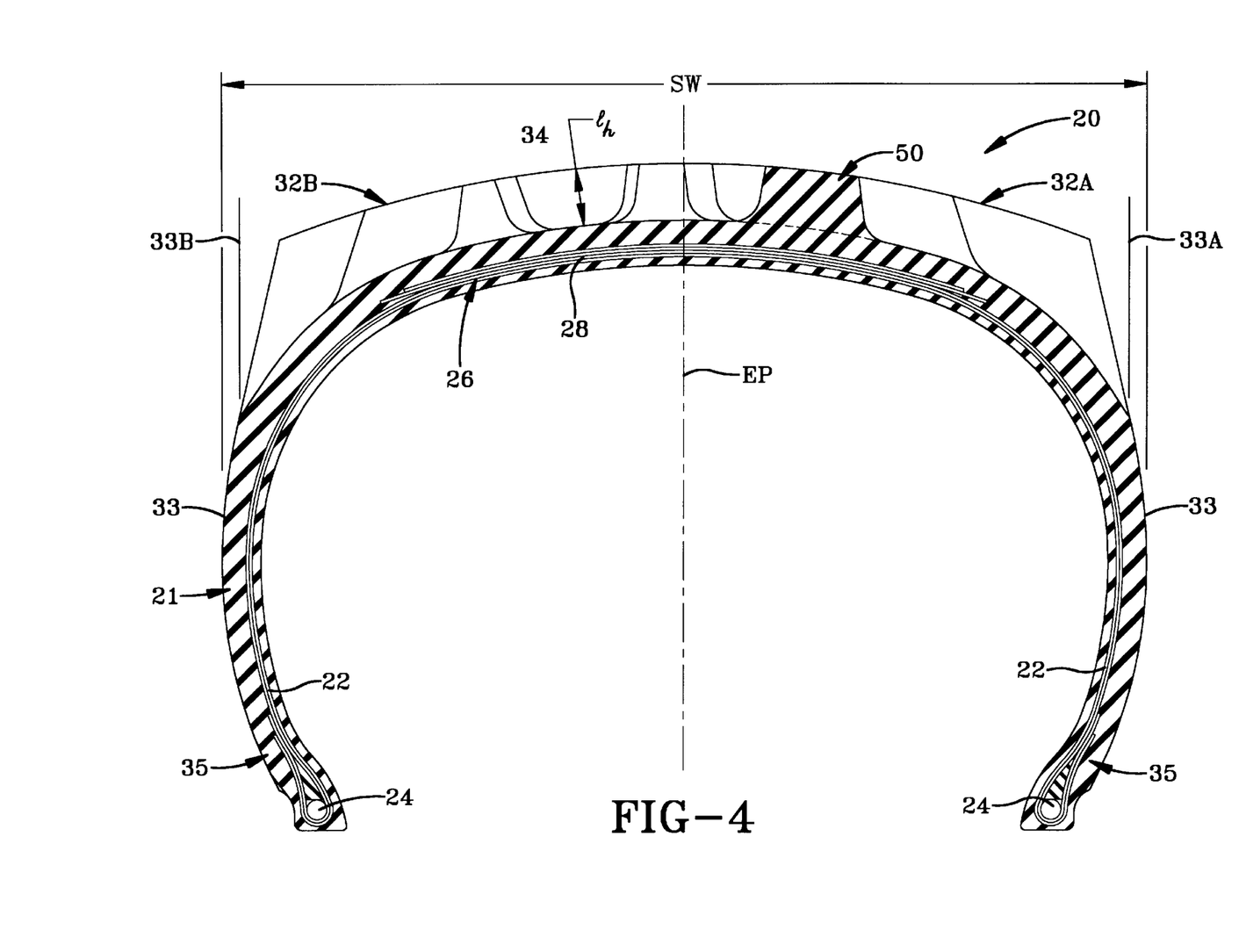
FIG. 4 is a cross-sectional view of the tire taken along lines 4—4 of FIG. 2.

Now referring to FIG. 4, a tire is shown in cross-section view generally as reference numeral 20. The pneumatic tire has a carcass 21 having one or more carcass plies 22 extending circumferentially about the axis of rotation of the tire 20. The carcass plies are anchored around a pair of substantially inextensible annular beads 24. A belt reinforcing member 26 comprising one or more belt plies 28 are disposed radially outwardly from the carcass plies. The belt plies provide reinforcement for the crown region of the tire. A circumferentially extending tread 32 is located radially outwardly of the belt reinforcing structure 26.

A sidewall portion 33 extends radially inwardly from each axial or lateral tread edge 33A,33B of the tread to an annular bead portion 35 having the beads 24 located therein.

The carcass plies 22 preferably have textile or synthetic cords reinforcing the plies. The cords are preferably oriented radially. Most preferably, the cords are made of polyester or nylon material. Typically, the tire may have two, three or four plies, each construction increasing in load carry capability as a function of the number of plies.

The belt reinforcement member 26 preferably includes at least two belts reinforced by synthetic cords of polyester, nylon, rayon or aramid.

Now referring to FIGS. 1–5, a tire 20 according to the present invention is illustrated. The tire 20 according to the present invention has a unique tread 32. The tread 32 has a first tread edge 33A and a second tread edge 33B. Disposed between the tread edges 33A,33B is an inner tread 34 and a plurality of central lugs 50 extending radially outwardly from the inner tread 34.

Figure 1:
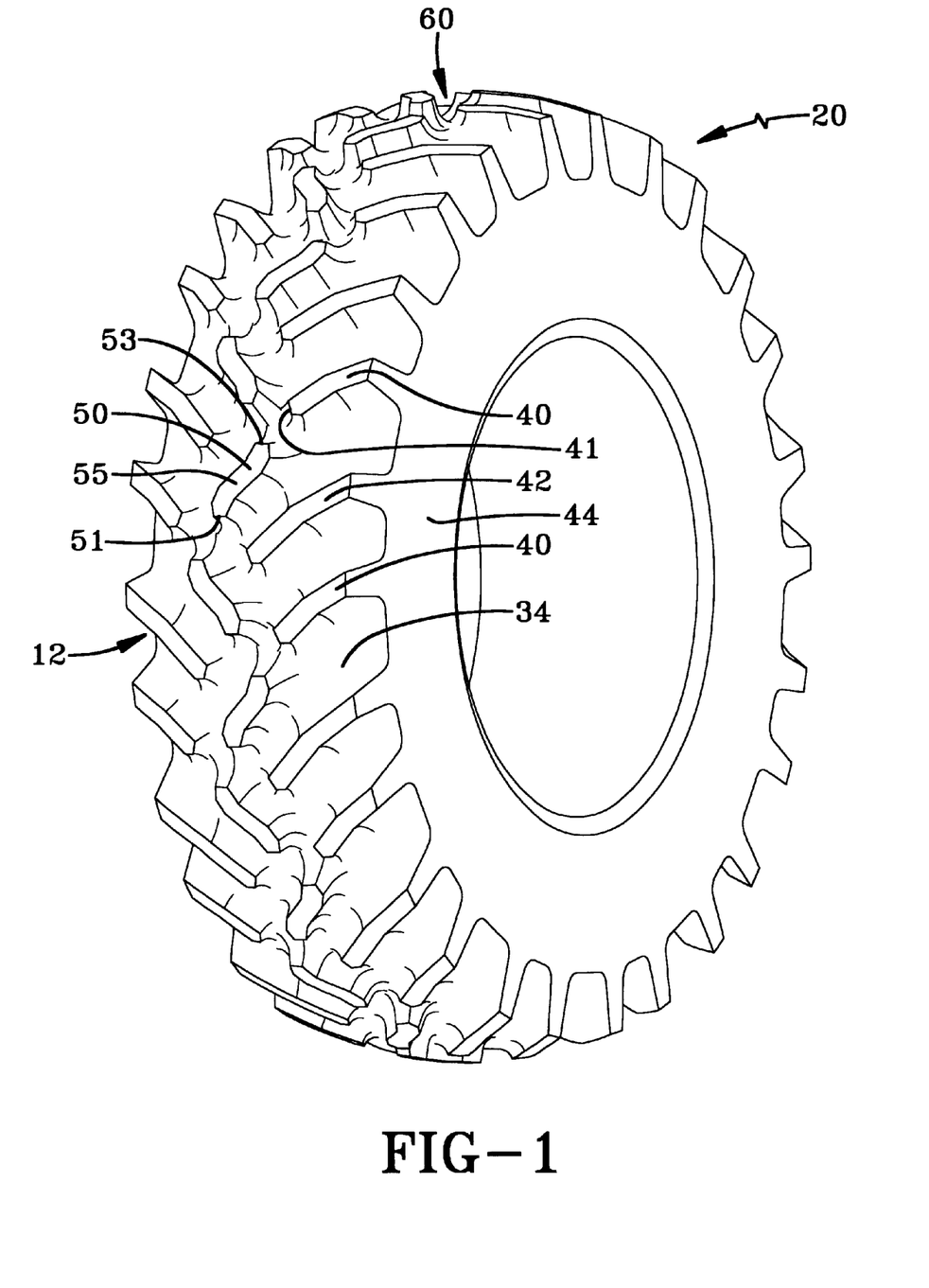
FIG. 1 is a perspective view of the preferred embodiment tire according to the invention.
Figure 2:
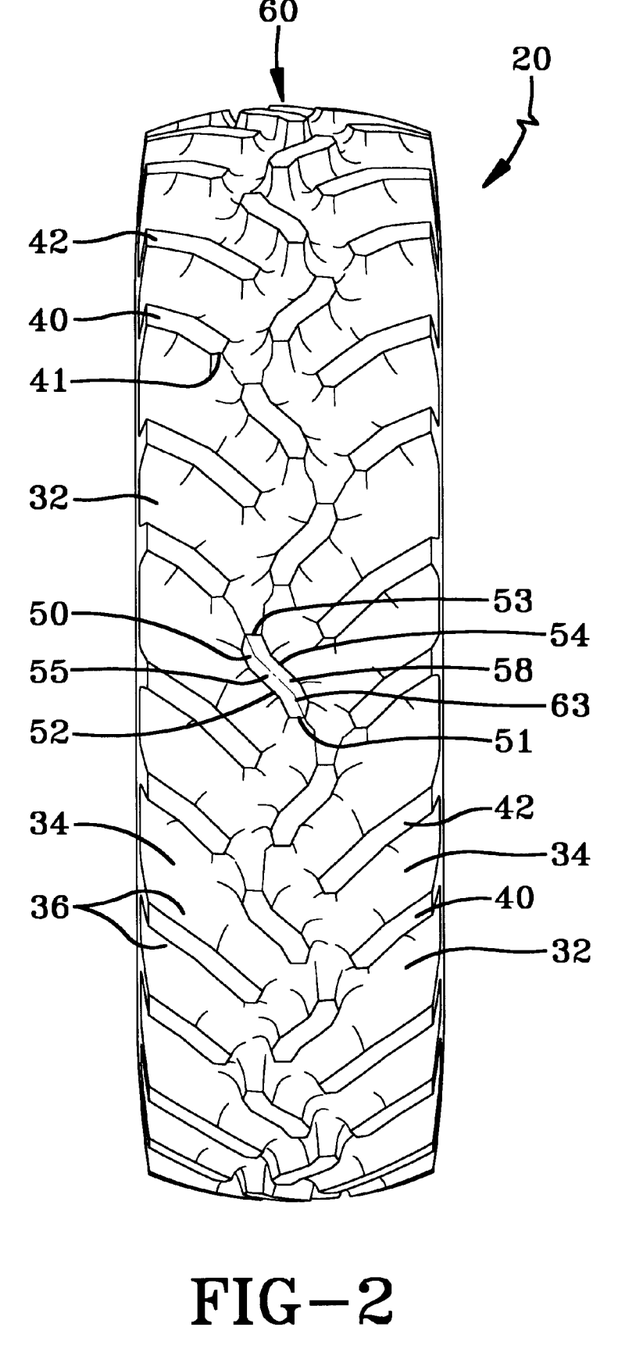
FIG. 2 is a plan view of the tire of FIG. 1.
Figure 3:
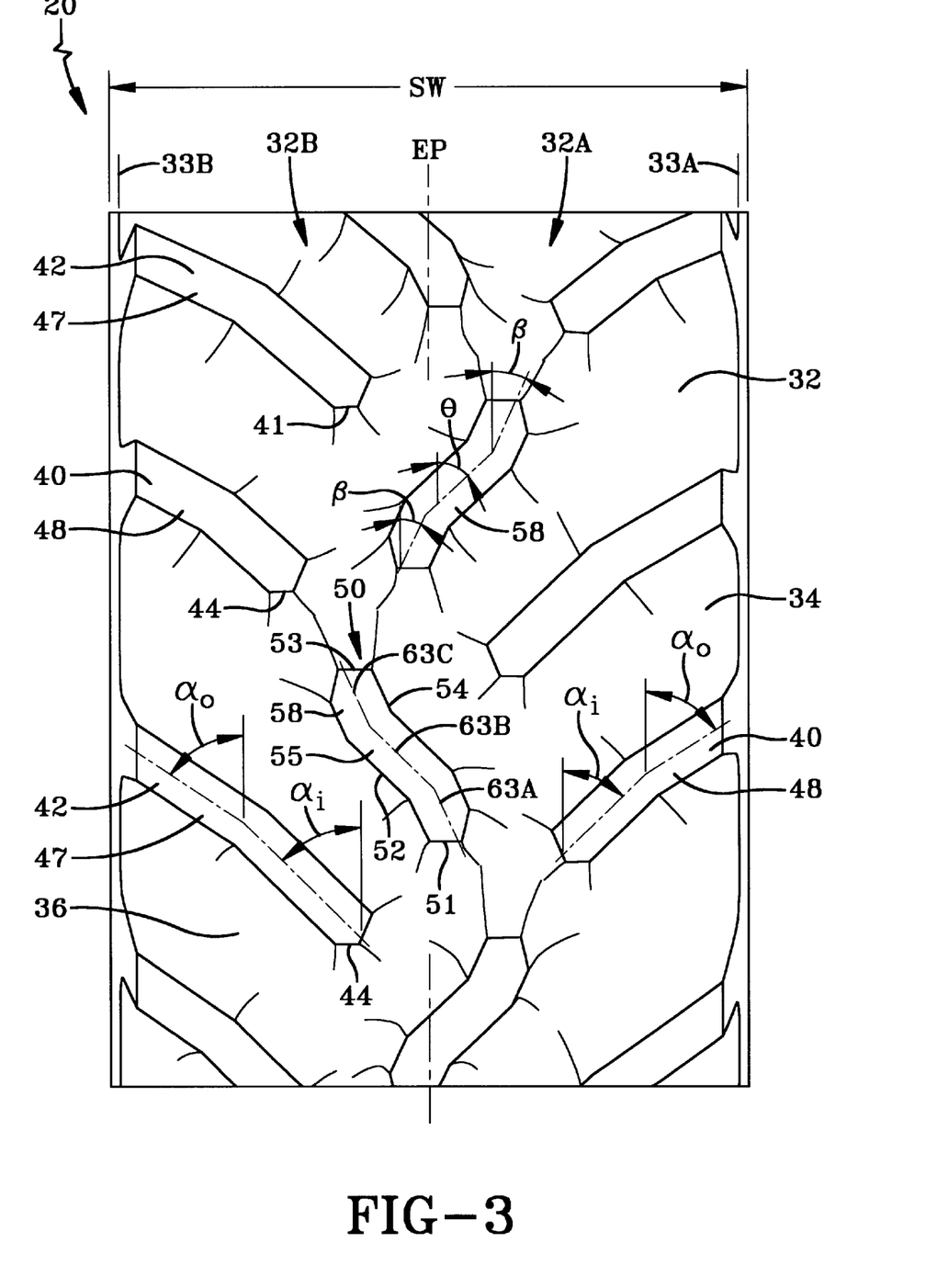
FIG. 3 is an enlarged fragmentary view of a portion of the tread of the tire taken from FIG. 2.

As illustrated in FIG. 2 each central lug 50 has a radially outer surface 58, a leading first edge 52, a trailing second edge 54 and a centerline 63 between the first and second edges. Each central lug 50 extends generally circumferentially from a leading end 51 to a trailing end 53.

Figure 5:
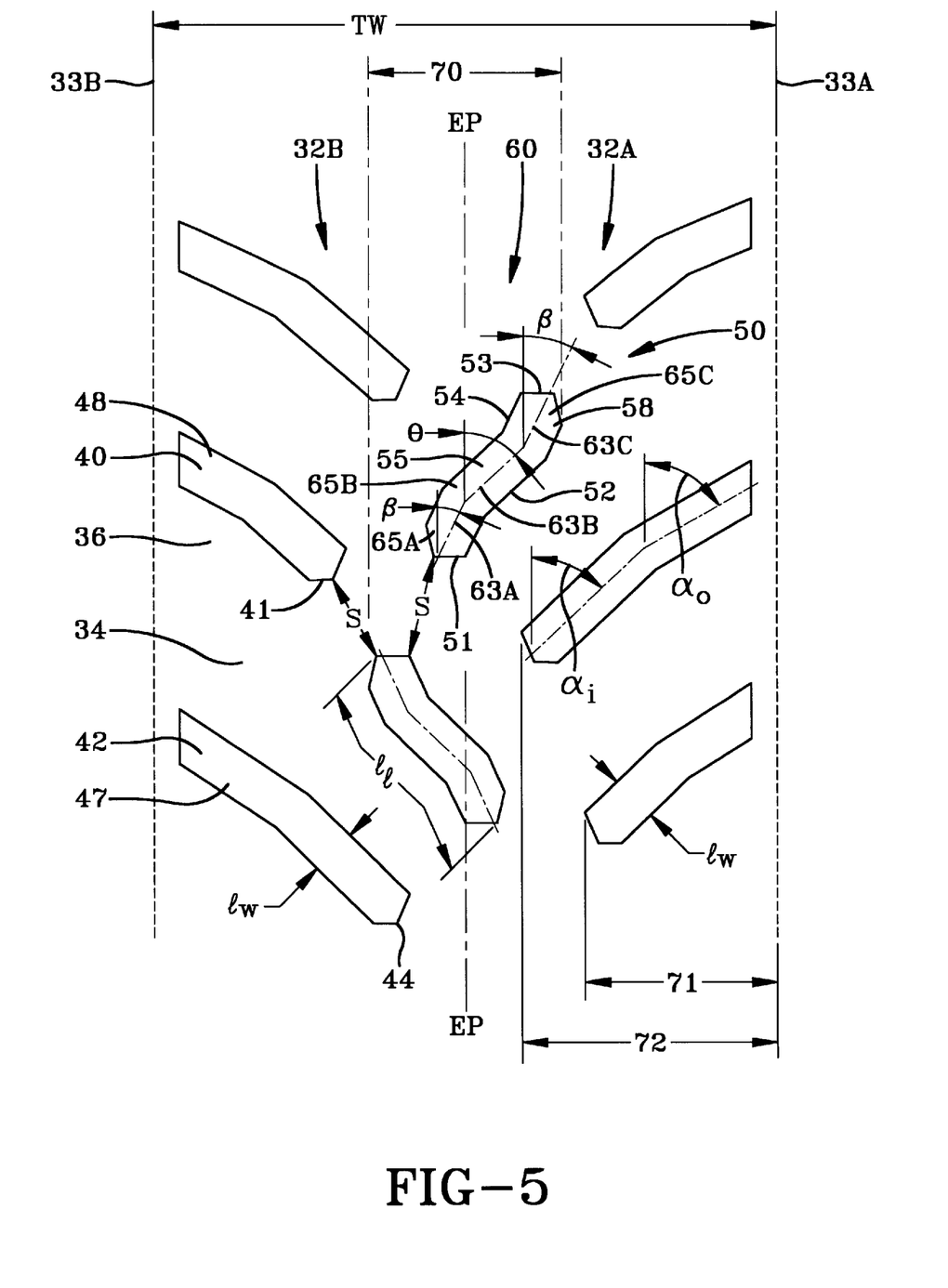
FIG. 5 is a plan view of a portion of the contact patch of the preferred tire according to the present invention.

As illustrated in FIG. 5 the radially outer surface 58 when viewed from the contact patch has a polygonal shape. The surface 58 when divided into portions, each encompassed by a substantially rectangular portion 65A, 65B and 65C exhibits the approximate orientation of the central lug 50. For purposes of this invention the centerlines 63A, 63B and 63C of the lug 50 is approximated by a line intersecting midway through, thus bisecting, the short legs of the rectangle, the line extending parallel to the long legs of the substantially rectangular portions 65A, 65B and 65C.

It is important to note that each of the lugs have a length ($l_l$) at least three times the average width of the element whereas block elements have an average width greater than one-third the length of the element. A lug for purposes of this invention has a length at least 10% of the section width of the tire, preferably the lug length as measured along the lug centerline should be more than 25% of the total tread width TW, more preferably at least 30% of the total tread width TW.

The average distance along the centerlines 63 between the leading and trailing ends 51,53 defines total the length ($l_l$) of the central lug 50.

The distance extending substantially perpendicularly between the first and second edges 52,54 of the central lug define the lug width ($l_w$). The radial distance extending between the inner tread 34 and the edges 52,54 of the lug 50 defines the radial lug height ($l_h$). The ratio of the lug width ($l_w$) to lug radial height ($l_h$) is less than two-thirds over at least 70% of the lug length ($l_l$) for the shoulder lugs.

The central lugs 50 are arranged in a circumferentially repeating row 60 of lugs 50, each lug 50 extends from its respective tread edge 33A,33B crossing the equatorial plane. The circumferentially adjacent center lugs 50 are similarly but oppositely oriented. Each lug 50 preferably lies equally within each of the respective tread halves 32A or 32B. The leading ends 51 as shown intersect the equatorial plane, with each central lug 50 having a majority of its leading end 51 portion on an opposite tread half relative to the circumferentially adjacent central lug. Similarly, the trailing end portions 53 are also located on opposite tread halves relative to the leading end 51 of the same lug 50 and on an opposite tread half relative to the trailing end portions 51 of circumferentially adjacent central lugs 50.

In order to maintain the handling performance of the tire, having alternating central lugs 50 at the center requires special attention to the central lug design.

The central lugs 50 arranged as illustrated create the effect of a central rib common in tractor tires that must be driven on road surfaces. Quite uncommon is interrupted open spacing S between the central lugs 50. The almost circumferential orientation of the leading and trailing end portions 51,53 permits the tread lugs 50 to penetrate even hard or compacted soils. Unlike most tractor ribs which prevent the tread from engaging the soil, these uniquely oriented central lugs 50 being narrow in lug width and widely spaced at a distance S of at least 175% of the lug width as measured at the surface 58 permits the tire to dig into the soil greatly enhancing traction performances.

Ride performance and traction capability is further enhanced by the employment of a plurality first shoulder lugs 40 which extend from each respective tread edge 33A or 33B and lie entirely within one tread half 32A or 32B. The first shoulder lugs 40 are relatively short in length having a total length $l_l$ equal to or less than the total length $l_l$ of the central lug 50. The first shoulder lug 40 has an axially inner end 41 that is circumferentially located between the leading end portion 51 and the trailing end portion 53 of circumferentially adjacent central lugs 50.

Interposed between each pair of first shoulder lugs 40 is a second shoulder lug 42. The second shoulder lug 42 preferably is substantially longer in total length than either the central lug 50 or the first shoulder lug 40. The long second shoulder lug 42 extends from a tread edge 33A or 33B toward the center of the tread 32. It lies entirely within one tread half 32A or 32B and has an axially inner end 44 circumferentially aligned with a trailing end portion 53 of a central lug 50, the trailing end portion 53 being in an opposite tread half 32A or 32B relative to the second shoulder lug 42.

As shown in FIG. 5, both the first shoulder lugs 40 and the second shoulder lugs 42 have preferably a compound inclination the axially inner inclination $\alpha_i$ being about 45° relative to the equatorial plane while the axially outer inclination $\alpha_o$ is about 60° relative to the equatorial plane.

A very important feature of the tread 32 is the number of central lugs 50 relative to the number of shoulder lugs 40,42. There is only one central lug 50 for every two shoulder lugs. This two-to-one ratio of shoulder lugs to central lugs creates a most open tread pattern yielding a very low net-to-gross ratio. The prior art DT710 tire mentioned earlier had a one-to-one ratio of central lugs to shoulder lugs thus yielding a more densely packed central area or region of the tread which has been suspected by some to be susceptible to poor tread cleaning in very wet sloppy solid conditions. This inventive tread 32, however, is perceived to be superior under these most severe conditions.

As further shown in FIG. 5 the central lug has a middle portion which has a centerline 63B between the leading and trailing edges 52,54. The centerline 63B is oriented at an angle θ of less than 50°, preferably less than 45° relative to the equatorial plane.

Similarly, the leading and trailing end portions 51,53 are similarly inclined, the respective centerlines 63A,63B being inclined at an angle β, β being about 30° or less relative to the equatorial plane preferably 30° or less.

As shown in FIG. 5 the net-to-gross ratio of the tread is less than 25%. The space between the lugs creates large soil discharge channels 36. These channels 36 increase in volume as they extend from the center of the tread toward the tread shoulders. This increasing volume feature permits the soil to flow outwardly when operating in very wet soil conditions.

The openness of the tread pattern further enhances the self-cleaning properties of the tread keeping it from packing with mud.

It is understood that one can vary the overall shape of the lugs and can modify the general orientation or appearance of the lugs without departing from the spirit of the claimed invention which is directed to the novel tread pattern disclosed herein.

A very important aspect of the inventive tire relates to the axial width 70 of the circumferentially continuous row 60 of central lugs 50. The full axial extent 70 as measured from the tires contact patch shown in FIG. 5 is only about 33% of the total tread width TW.

The first shoulder lugs extend axially inwardly a distance 71 of only about 30% of the tread width from their respective tread edge.

The second shoulder lugs being longer extends axially from a tread edge to an axially innermost location 72 of 40% of the tread width.

Accordingly, only the second shoulder lugs axially are fractionally aligned with a small portion of the trailing end portion 53 of the central lugs 50 which lie on the same tread half 32A or 32B.

In an 18.4R42 tire made in accordance to the invention. The tread width TW was 17.44 inches and the tread had a net-to-gross ratio of 21%. The axial width 70 of the row 60 was 5.829 inches or 33% TW. The axial extent 71 of the first shoulder lug 40 was 5.05 inches or 29% TW. The axial extent 72 of the second shoulder lug 42 was 7.03 inches or 40.3% TW. The lug lengths were 6.4 inches for the central lug 37% of TW, 6.1 inches 35% TW for the first shoulder lug 40, and 8.6 inches or 49% TW for the second shoulder lug 42.

The central lug 50 had the leading end portion 51 of a length measured along the centerline 63A set at 2.3 inches or 36% of the total lug length $l_t$, the middle portion 55 of a length of 2.0 inches or 31% of the total lug length and the trail end portion 55 of a length of 2.14 inches or 33% of the total lug length.

The angles θ and β were 45° and 30° respectively for the central lug. The angles $\alpha_o$ and $\alpha_i$ for the first and second shoulder lugs 40,42 were the same, $\alpha_o$ being 56.5° and 45.4° relative to the equatorial plane. The lug width LW for the central lug 50 was 1.5 inches while the lug width for the first and second shoulder lugs was about 1.4 inches. The central lug 50 had the lug height set at a conventional R-1 tractor lug height as specified in the Tire and rim Association Standards, that dimension being about 1.61 inches for the exemplary tire as measured at the equatorial plane.

As can be seen, the preferred tread 32 had the adjacent soil discharge channels 36 of unequal circumferential width or spacing. This feature although beneficial for ride performance was not a mandatory design feature. It is believed equal spacing could work as well, it being understood that the channels 70 must not decrease as they extend axially outwardly.

What is claimed is:

1. A pneumatic agriculture tire for a tractor having a maximum section width (W), an axis of rotation, an equatorial plane centered within the maximum section width and being perpendicular to the axis, a casing having a carcass reinforced with rubber coated cords, a rubber tread disposed radially outwardly of the carcass, the tread being divided on each side of the equatorial plane into a first and a second tread half, the tread having a pair of lateral tread edges, the distance between the tread edges defining the tread width, the tread having an inner tread and a plurality of tread lugs projecting radially from the inner tread, the tread being characterized by:

a plurality of central lugs arranged in a circumferentially continuous row and extending across the equatorial plane, each central lug being oppositely oriented relative to each circumferentially adjacent central lug, each central lug having a substantially circumferentially extending leading end portion and a substantially circumferentially extending trailing end portion, the leading end portion of each central lug being located on an opposite side of the equatorial plane relative to the trailing portion of the same central lug and wherein each of said plurality of central lugs is positioned such that each central lug lies equally within each of said first and second tread half; and wherein on each tread half, a plurality of first shoulder lugs extend from the lateral edge toward the equatorial plane, the first shoulder lugs extending from one lateral edge being opposite in orientation relative to the first shoulder lugs extending from the other lateral edge, the first shoulder lugs having a total length equal to or less than a total length of a central lug; and wherein on each tread half, a plurality of second shoulder lugs extend from the lateral edge toward the equatorial plane, the second shoulder lugs extending from one lateral edge being opposite in orientation relative to the second shoulder lugs extending from the other lateral edge, each second shoulder lug being circumferentially located between a pair of first shoulder lugs within the tread half from which it is located, the second shoulder lugs having a substantially longer total length than either a total length of a central lug or a total length of a first shoulder lug;

wherein there is only one central lug for every two shoulder lugs.

2. The pneumatic agricultural tire of claim 1, wherein each of the second shoulder lugs have an axially inner end circumferentially aligned with a trailing end portion of a central lug.

3. The pneumatic agricultural tire of claim 2, wherein each central, first shoulder, and second shoulder lug has a radially outer surface, and the minimum distance, between the surfaces of the lugs is greater than 175% of the average width of the lugs as measured at the radially outer surface.

4. The pneumatic agricultural tire of claim 3 wherein the tread has a net-to-gross ratio of less than 25% as measured around the entire 360° circumference of a normally inflated and normally loaded tire contacting a flat hard surface.

5. The pneumatic agricultural tire of claim 1 wherein the central lugs each have an elongated middle portion, the middle portion has a pair of lug edges, one leading edge and one trailing edge, a line centered between the leading and trailing edge at the surface of the middle portion defines the central lug centerline, the centerline is inclined at an included angle θ relative to the equatorial plane of the tread, the angle θ being less than 50°.

6. The pneumatic agricultural tire of claim 5 wherein the central lugs leading and trailing end portions each have a centerline, the respective centerlines being substantially circumferentially extending at an angle β, β being about 30° relative to the equatorial plane.

7. The pneumatic agricultural tire of claim 6 wherein the central lug has a total lug length, as measured along the leading end, trailing end and middle portions centerlines, and the middle portion has a length of 30% or more of the total lug length.

8. The pneumatic agricultural tire of claim 7 wherein the length of the trailing end portion and the length of leading end portion are each at least 20% of the total lug length.

9. The pneumatic agriculture tire of claim 1 wherein
the first shoulder lugs extend from the lateral edges axially inwardly a distance of about 25% of the tread width;
the second shoulder lugs extend from the lateral edges axially inwardly a distance of about 40% of the tread width.

* * * * *